United States Patent [19]
Holmes et al.

[11] Patent Number: 5,367,402
[45] Date of Patent: Nov. 22, 1994

[54] HELMET MOUNTED NIGHT VISION APPARATUS AND METHOD OF SEPARATION

[75] Inventors: Roy H. Holmes, Salem; Albert M. Baril, Roanoke, both of Va.

[73] Assignee: ITT Corporation, New York, N.Y.

[21] Appl. No.: 990,061

[22] Filed: Dec. 14, 1992

[51] Int. Cl.$^5$ .................... G02B 23/00; G02B 23/12
[52] U.S. Cl. .................... 359/400; 359/480; 2/6.2; 2/6.3; 244/121; 244/122 AE; 244/122 AG
[58] Field of Search ............... 359/400, 410, 411, 409, 359/480, 481; 2/6.2, 6.3; 33/262; 244/121, 122 A, 122 AE, 122 AG, 122 AH

[56] References Cited

U.S. PATENT DOCUMENTS

| | | |
|---|---|---|
| 4,449,787 | 3/1984 | Burbo et al. |
| 4,651,951 | 3/1987 | McFarlane ................ 244/122 AG |
| 4,689,834 | 9/1987 | McCarthy et al. ................ 2/6.2 |
| 4,711,411 | 12/1987 | Copp ................ 244/122 A |
| 4,734,939 | 4/1988 | Copp ................ 2/6.2 |
| 4,918,752 | 4/1990 | Briggs ................ 2/6.2 |
| 5,176,342 | 1/1993 | Schmidt et al. |

FOREIGN PATENT DOCUMENTS

| | | |
|---|---|---|
| 2144558A | 3/1985 | United Kingdom . |
| 2179543 | 3/1987 | United Kingdom ................ 2/6.3 |
| 2195187A | 3/1988 | United Kingdom . |

*Primary Examiner*—Edward K. Look
*Assistant Examiner*—Christopher Verdier
*Attorney, Agent, or Firm*—Arthur L. Plevy; Patrick M. Hogan

[57] ABSTRACT

A helmet mounted night vision device for a pilot that is automatically propelled away from the pilot before the pilot ejects from an aircraft, thereby preventing injury to the pilot caused by the night vision device striking the ejecting pilot. In a preferred embodiment, the present invention night vision device is a binocular device, having a right optical assembly and a left optical assembly that are viewed by the right and left eyes of the pilot, respectively. The right and left optical assemblies are each attached to elongated arm members. Each of the arm members, supporting the optical assemblies, are pivotably coupled to a common mounting plate that is removably attachable to the helmet of the pilot. Prior to ejection, the left and right optical assemblies are joined in front of the eyes of the pilot, thereby forming the binocular device. Before the pilot ejects, the left and right arm members pivotably rotate in opposite directions and detach from the common mounting plate, thereby separately propelling the right and left optical assemblies away from the pilot.

22 Claims, 9 Drawing Sheets

HELMET MOUNTED NIGHT VISION APPARATUS AND METHOD OF SEPARATION

FIELD OF THE INVENTION

The present invention relates to helmet mounted night vision devices or pilots, and more particularly to such night vision devices that are laterally propelled away from the pilot before the pilot is ejected from the aircraft, thereby preventing injury to the pilot due to the night vision device striking the ejecting pilot.

BACKGROUND OF THE INVENTION

Night vision devices are commonly used by pilots to enhance their visibility while flying during night or other low-light conditions. Conventional night vision devices include image intensifier tubes, lens assemblies, battery packs and adjustable mountings that provide the night vision devices with a significant mass. In the prior art, the mass of a night vision device is conventionally supported in front of the eyes of a pilot either by attaching the night vision device directly to the pilot's helmet or attaching the night vision device to a goggle assembly that is strapped around the pilot's helmet. A prior art helmet mounted night vision device is exemplified in U.S. Pat. No. 4,449,787 to Burbo, et al., entitled

NIGHT VISION IMAGING SYSTEM ADAPTED FOR HELMET MOUNTING

When a pilot ejects from an aircraft, large acceleration forces are developed as the pilot is suddenly propelled away from the aircraft. For this reason, it is highly desirable to detach the night vision device from the pilot's head prior to ejection. By detaching the night vision device from the pilot's head, the mass of the pilot's helmet is reduced. This reduces the chance of injury to the pilot's neck during the sudden accelerations incurred during ejection. Furthermore, by selectively detaching the night vision device from the pilot's helmet, the night vision device is prevented from colliding with the pilot's face or body during ejection. In the prior art, the release mechanisms used to separate night vision devices from a pilot's helmet are operated by simply releasing the night vision device from the helmet. The separated night vision device is free to travel in any direction within the cockpit since no predictable direction or trajectory is provided to the device as it is separated from the pilot. The path traveled by the separated night vision device is predicated by random forces, such as the acceleration of the aircraft, wind entering the cockpit, the inclination of the aircraft and any residual impetus from the separation of the device from the pilot's helmet. The time elapsed between the separation of the night vision device from the pilot's helmet and the acceleration of the pilot caused by the ejection mechanism is very short. As such, there remains a significant probability that the released night vision device will contact a portion of the body of the ejecting pilot. The acceleration of an ejecting pilot coupled with the mass of night vision device, leads to a scenario where the night vision device may strike the pilot's body with a significant force. Consequently, there remains a significant probability that the pilot will be injured by the night vision device while ejecting from the aircraft.

It is therefore a primary object of the present invention to provide a night vision device that separates from a pilot's helmet in a controlled manner and allows the night vision device to be propelled clear of the pilot's body before the pilot is ejected from the aircraft.

SUMMARY OF THE INVENTION

The present invention is a helmet mounted night vision device for a pilot that is automatically propelled away from the pilot before the pilot is ejected from an aircraft, thereby preventing injury to the pilot. In a preferred embodiment, the present invention night vision device is a binocular device, having a right eye optical assembly and a left eye optical assembly. The right and left optical assemblies are each attached to elongated arm members. Each of the arm members, supporting the optical assemblies, are pivotably coupled to a common mounting plate that is removably attachable to the helmet of the pilot, Prior to ejection, the left and right optical assemblies are positioned in front of the eyes of the pilot, thereby forming the binocular device. The optical assemblies are held in place by a trigger locking mechanism that prevents the pivotal rotation of the arm members supporting the optical assemblies.

Before the pilot ejects from the aircraft, the trigger locking mechanism is automatically released and the binocular assembly divides. The arm member holding the left optical assembly and the arm member holding the right optical assembly begin to pivotably rotate in opposite directions. The pivotal rotation of each of the arm members is assisted both by gravity and by a spring bias that acts upon each arm member. As the arm members pivotably rotate, they reach a position where each of the arm members disengage from the common mounting plate on which they were pivotably coupled. The impetus of the optical assemblies and the point of disengagement with the common mounting bracket operate to project each of the optical assemblies away from the pilot in opposite directions, Each optical assembly is directed away from the body of the pilot, thereby preventing the pilot's body from impacting against the optical assemblies as the pilot is ejected from the aircraft.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE PREFERRED EMBODIMENT

Figure 1A:
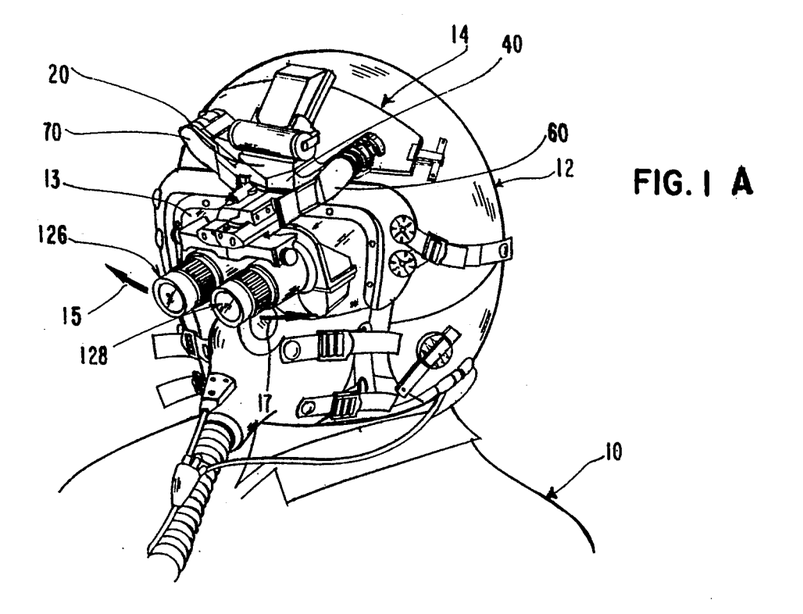
FIG. 1a is a perspective view of one preferred embodiment of the present invention night vision device, shown in conjunction with a pilot's helmet assembly to facilitate discussion and consideration.

Referring to FIG. 1a, there is shown a pilot 10 wearing a conventional flight suit that includes a helmet 12. An interface assembly 14 is attached to the helmet 12 allowing a binocular night vision assembly 20 to be selectively joined to the helmet 12 at a known orientation. The binocular night vision assembly 20 is comprised of a right monocular assembly 126 and a left monocular assembly 128 that are positioned in front of the pilot's visor 13 so as to be viewed by the pilot 10. The right monocular assembly 126 and the left monocular assembly 128 are separately formed components, wherein the right monocular assembly 126 is supported by a right arm member 70 and the left monocular assembly 128 is supported by a left arm member 60. Both the left and right arm members 60, 70 are pivotable attached to common pivot mount assembly 40 that is selectively attached to the top of the helmet 14. When the pilot 10 ejects from an aircraft, the left monocular assembly 128 separates from the right monocular assembly 126. Due to the pivotable interconnection between the left and right arm members 60, 70 to the pivot mount assembly 40, the right and left monocular assemblies 126, 128 begin to rotate away from one another in the direction of arrows 15 and 17.

Figure 1B:
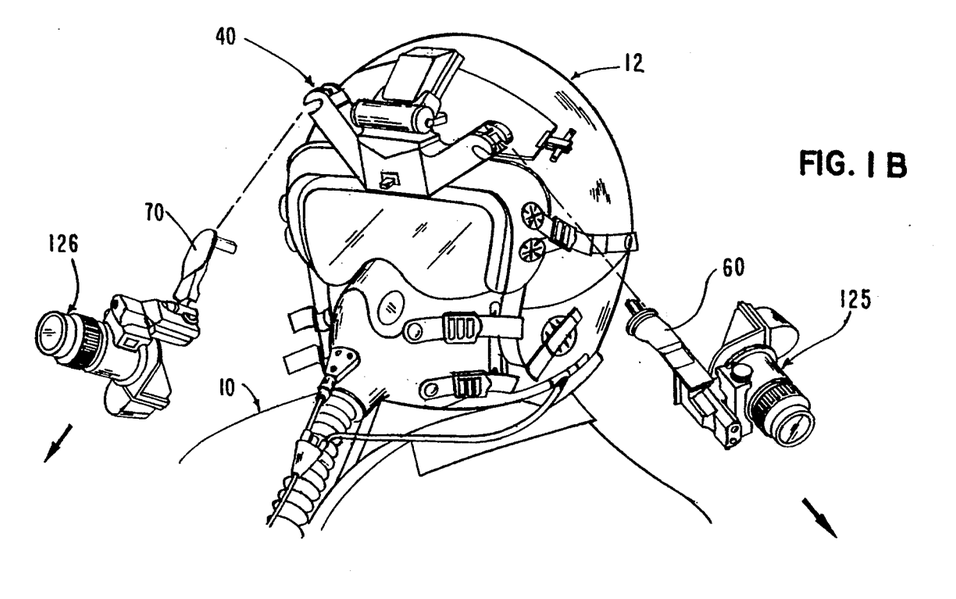
FIG. 1b shows the embodiment of FIG. 1 after the left and right monocular assemblies have been ejected away from the pilot's helmet.

Referring to FIG. 1b, it can be seen that as the right and left monocular assemblies 126, 128 rotate away from one another, the right and left arm members 70, 60 detach from the pivot mount assembly 40. As will be later explained, the impetus of the right and left monocular assemblies 126, 128 and the point of detachment with the pivot mount assembly 40 are calculated to propel the right and left monocular assemblies 126, 128 away from the pilot 10 along trajectories that prevent the monocular assemblies from striking the pilot 10 as the pilot 10 ejects from the aircraft.

Figure 2:
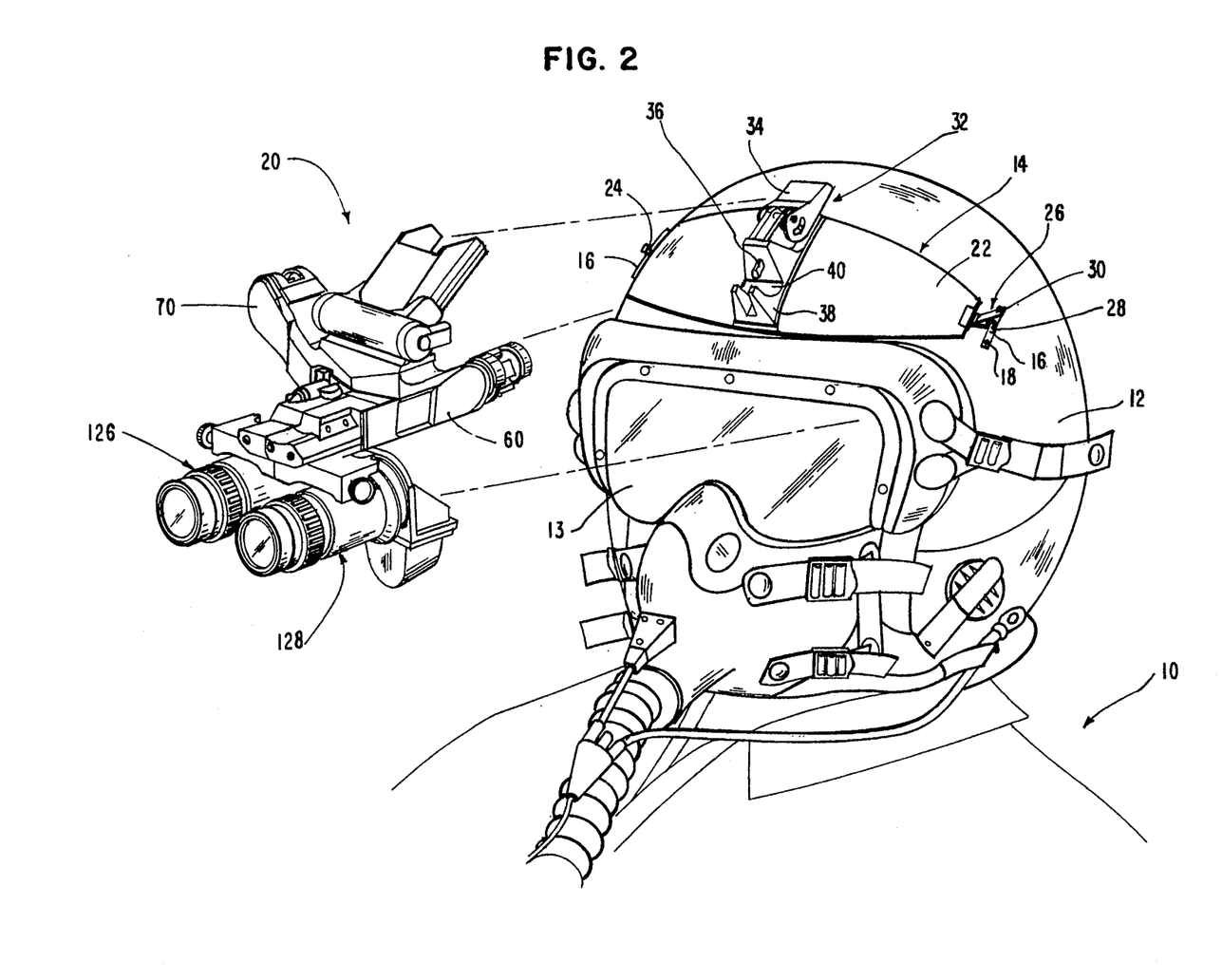
FIG. 2 is a partially exploded perspective view of the embodiment of FIG. 1a, shown in conjunction with a pilot's helmet to illustrate the components that mount the present invention night vision device to the pilot's helmet.

Referring to FIG. 2, it can be seen that the binocular night vision assembly 20 is connected to the pilot's helmet 12 by an interface assembly 14. The interface assembly 14 is joined to the helmet 12 via two anchoring elements 16. The anchoring elements 16 are attached to the helmet 12 with mechanical fasteners 18 such as screws or rivets. In preferred embodiment, the helmet 12 worn by the pilot 10 is HGU-55/P helmet. The HGU-55/P helmet is manufactured with holes above the temple region. The anchoring elements 16 can be attached to the helmet 12 with the mechanical fasteners 18 utilizing the existing holes. Consequently, no new holes are formed in the helmet 12 in order to attach the anchoring elements 16 to the helmet 12. The anchoring elements 16 are relatively flat and lay very close to the helmet 12. As such, if the interface assembly 14 is not attached to the anchoring elements 16, the anchoring elements 16 do not interfere with the movement of conventional visors that may be used in conjunction with the helmet 12.

The interface assembly 14 is comprised of a flexible base member 22 having a hook 24 at one end and a hook and latch device 26 at the opposite end. The hook engages the unshown anchoring element at the user's or wearer's right side of the helmet 12. The hook and latch device 26 engages the anchoring element 16 on the shown side of the helmet 12. The hook and latch device 26 is comprised of a hook element 28 that engages the anchoring element 16 and a overcenter latch 30 that pulls the flexible base member 22 taut between anchoring elements 16. The hook element 28 is threadably attached to the overcenter latch 30 so that the length of the hook and latch device 26 can be adjusted, thereby enabling the flexible base member 22 to be properly attached to different sized helmets.

A quick-release latch assembly 32 is positioned at the center of the flexible base member 22. The latch assembly 32 includes a release lever 34 which enables the manipulation of a spring-loaded plunger rod 36. The plunger rod 36 extends into a tapered bracket 38 having a central recess 40. The plunger rod 36 extends partially over the central recess 40. As such, the plunger rod 36 can retain an arm member (not shown) formed as part of the night vision assembly 20, within the central recess 40 of the bracket 38. By manipulating the release lever 34, the plunger rod 36 can be retracted from the central recess 40, thereby allowing the night vision assembly 20 to separate from the quick-release assembly 32. The attachment of the night vision assembly 20 to the quick-release assembly 32 is aided by the tapered shape of the bracket 38, which accommodates any initial misplacement of the night vision assembly 20, with respect to its corrected final location, by guiding the night vision assembly 20 into a proper orientation.

Figure 3:
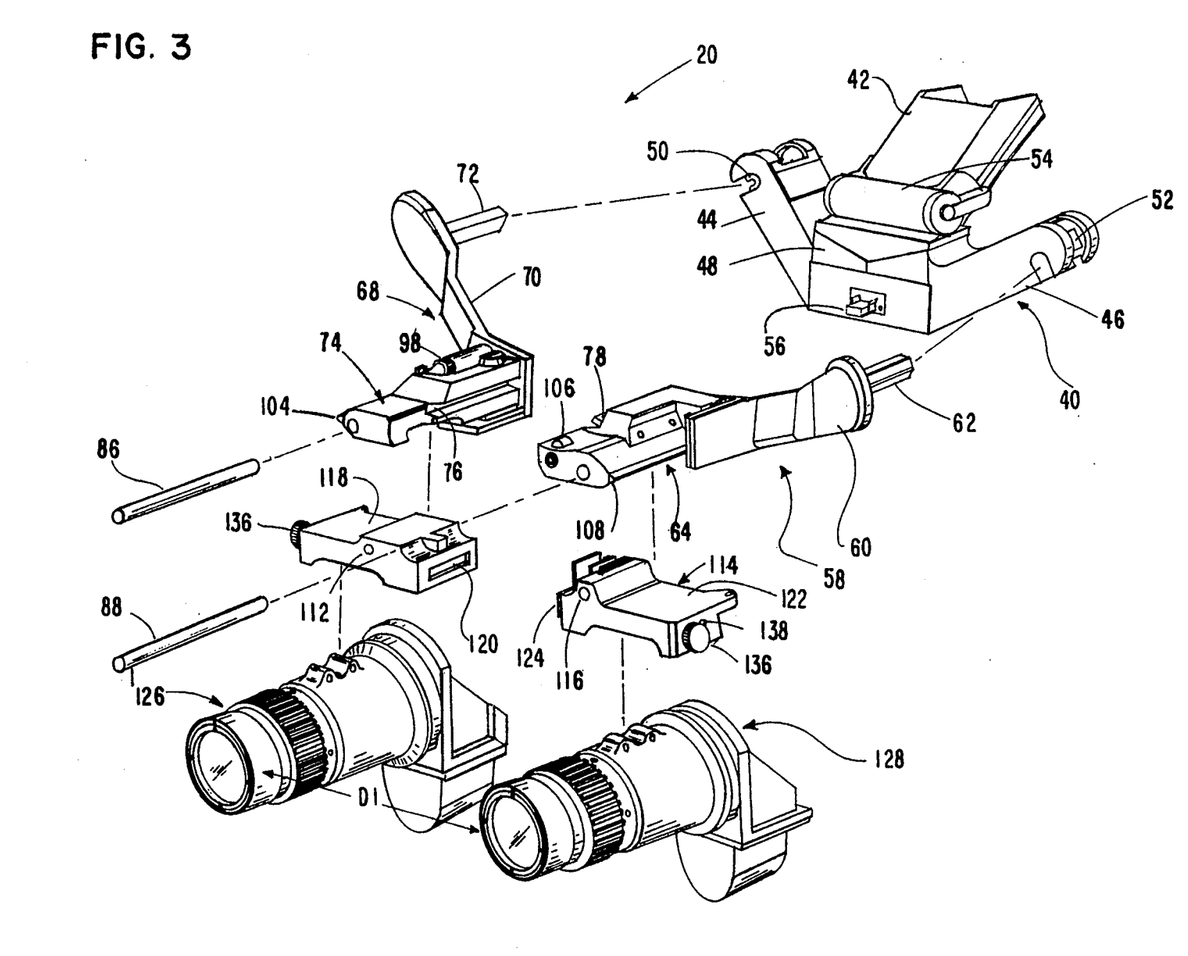
FIG. 3 is an exploded view of the present invention night vision device shown in FIG. 2.

Referring to FIG. 3, it can be seen that the night vision assembly 20 includes a pivot mount assembly 40 that is selectively joined to the pilot's helmet by a receiver mount 42. The receiver mount 42 is formed to be selectively engaged by the quick release assembly 32, previously described in regard to FIG. 2. Using the perspective of the pilot, it can be seen that the pivot mount assembly 40 has a protruding right support member 44 and left support member 46 extending from a central body 48.

The right monocular assembly 126 and left monocular assembly 128 are pivotably coupled to the right and left support members 44, 46 of the pivot mount 40, respectively. The right monocular assembly 126 is pivotably joined to the right support member 44 of the pivot mount assembly 40, via a right arm assembly 68 and a right shelf member 110. The right arm assembly 68 includes a right arm member 70 that pivotably interconnects with the right support member 44 of the pivot mount assembly 40, via a right pivot pin 72. The right arm assembly 68 further includes a vertical adjustment assembly 74 that adjusts the vertical position of both the left and right monocular assemblies 126, 128, in relation to the pilot's eyes, in a manner later described. The vertical adjustment assembly 74 is adapted to receive the right shelf member 110, the purpose of which will also be later described. The right shelf member 110 is adapted to receive the right monocular assembly 126. As such, the right monocular assembly 126, right shelf member 110, vertical adjustment assembly 74 and right arm member 70 all rotate in unison, pivoting around right pivot pin 72.

The left monocular assembly 128 is pivotably joined to the left support member 46 of the pivot mount assembly 40, via a left arm assembly 58 and left shelf member 114. The left arm assembly 58 includes a left arm member 60 that pivotably interconnects with the left support member 46 of the pivot mount assembly 40, via a left pivot pin 62. The left arm assembly 58 further includes a horizontal adjustment assembly 64 that adjusts the horizontal position of both the left and right monocular assemblies 126, 128, in relation to the pilot's eyes, in a manner to be later described. The horizontal adjustment assembly 64 is adapted to receive the left shelf member 114, the purpose of which will also be later described. The left shelf member 114 is adapted to receive the left monocular assembly 128. As such, the left monocular assembly 128, left shelf member 114, horizontal adjustment assembly 64 and left arm member 60 all rotate in unison, pivoting around left pivot pin 62.

The pivotal rotation of the right monocular assembly 126 away from the left monocular assembly 128 is prevented by the presence of a trigger bar 56 that extends from the pivot mount assembly 40 and engages both the right arm member 70 that supports the right monocular assembly 126 and the left arm member 60 that supports the left monocular assembly 128. The operation of the trigger bar 56 will be later described in regard to FIGS. 8a and 8b. The right support member 44 and the left support member 46 of the pivot mount assembly 40, both terminate with a substantially C-shaped configuration. A right ejector assembly 50 is positioned within the C-shaped end of the right support member 44. Similarly, a left ejector assembly 52 is positioned within the C-shaped end of the left support member 46. As will be later explained, the right and left ejector assemblies 50, 52 engage the right and left pivot pins 72, 62, respectively and provide a spring bias to both the right monocular assembly 126 and the left monocular assembly 128 that operates pivotably rotate each assembly away from one another. Prior to ejection, the right monocular assembly 126 and the left monocular assembly 128 are positioned in front of the eyes of the pilot. At this operating position, the right arm assembly 68 and the left arm assembly 58, that support the right and left monocular assemblies 126, 128, are physically joined. A groove 76 is formed within the vertical adjustment assembly 74. A tongue member 78 that is shaped to engage the slotted groove 76 is formed on the horizontal adjustment assembly 64. As will be later explained, the joining of the tongue member 78 into the slotted groove 76 is used to physically link the horizontal adjustment assembly 64 and the vertical adjustment assembly 74 so that they move in unison.

Figure 4:
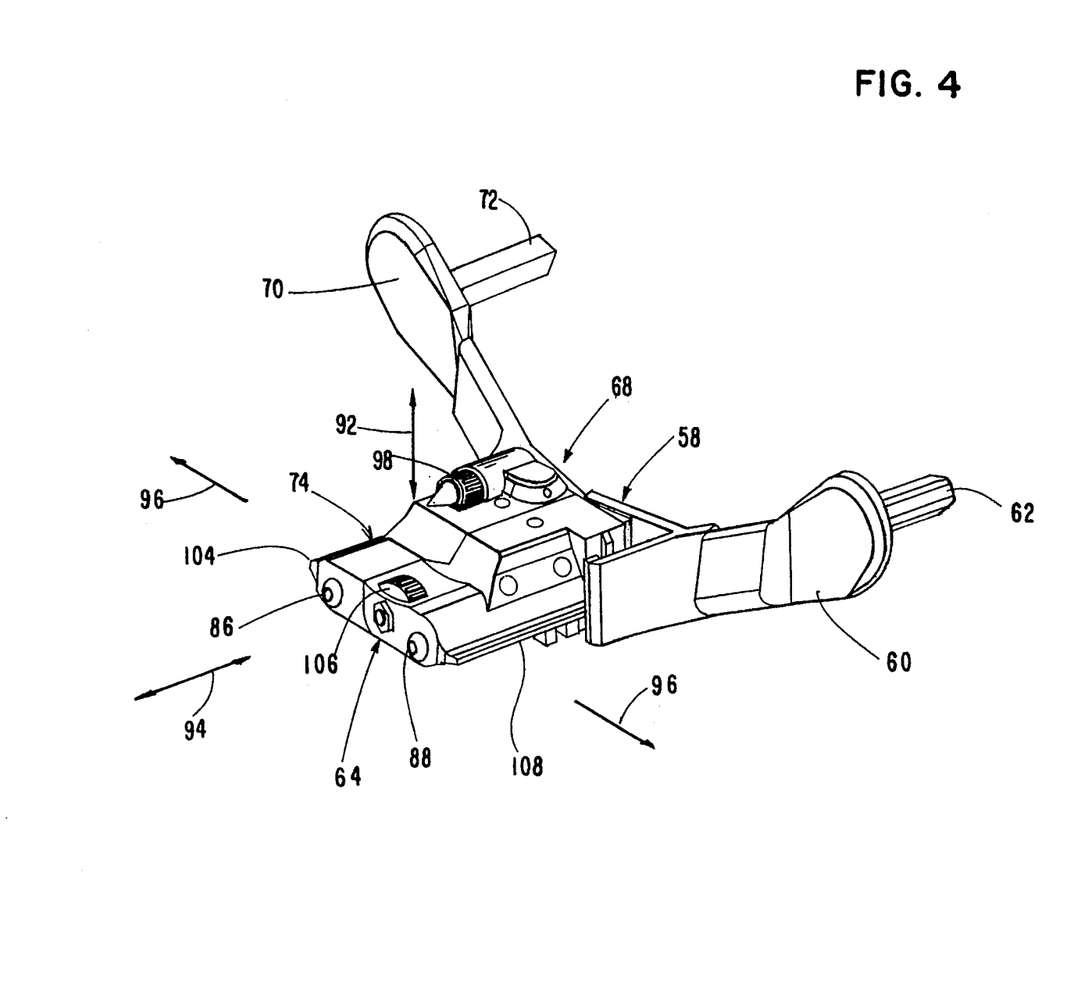
FIG. 4 is an isolated view of the combined left and right arm assemblies of the present invention night vision device.

Referring to FIG. 4 in conjunction with FIG. 3, it can be seen that the horizontal adjustment assembly 64 joins with the vertical adjustment assembly 74. When joined, the tongue member 78 of the horizontal adjustment assembly 64 enters the slotted groove 76 formed within the vertical adjustment assembly 74 so as to physically link the two components. The vertical adjustment assembly 74 is adjustably coupled to the elongated right arm member 70. Similarly, horizontal adjustment assembly 64 is adjustably coupled to the left arm member 60. A right slide rod 86 passes through the vertical adjustment assembly 74, joining the vertical adjustment assembly 74 to the right arm member 70. A left slide rod 88 passes through the horizontal adjustment assembly 64, joining the horizontal adjustment assembly 64 to the left arm member 60.

When the vertical adjustment assembly 74 is joined to the horizontal adjustment assembly 64, as is shown in FIG. 4, the two components are physically joined in a manner that prevents the independent movement of either component in the vertical direction, as indicated by arrow 92, or in the horizontal direction, as indicated by arrow 94. However, if moved in the direction of arrows 96, the vertical adjustment assembly 74 and the horizontal adjustment assembly 64 easily separate. A vertical adjustment knob 98 is disposed on the vertical adjustment assembly 74. The vertical adjustment knob 98 selectively controls the vertical position of the vertical positioning assembly 74 on the right arm member 70. Consequently, by the manipulation of the vertical adjustment knob 98, the vertical adjustment assembly 74, can be selectively raised and lowered in the directions of arrow 92. When the horizontal adjustment assembly 64 is attached to the vertical adjustment assembly 74, the horizontal adjustment assembly 64 acts as a passive slave to the vertical adjustment assembly 74 and moves in unison with the vertical adjustment assembly 74.

A horizontal adjustment knob 106 is positioned on the horizontal adjustment assembly 64. The horizontal adjustment knob 106 controls the movement of the horizontal assembly 64 back and forth along the left slide rod 88. When the horizontal adjustment assembly 64 is joined with the vertical adjustment assembly 74, the vertical adjustment assembly 74 moves passively in the horizontal with the horizontal adjustment assembly 64. The movement of both the vertical adjustment assembly 74 and the horizontal adjustment assembly 64 is guided by the right and left side rods 86, 88, respectively. Similarly, stabilizer flanges 104, 108 extend from both the vertical adjustment assembly 74 and the horizontal adjustment assembly 64, respectively. As will later be explained, the stabilizer flanges 104, 108 engage below lying elements which help guide the horizontal movement of both the vertical adjustment assembly 74 and the horizontal adjustment assembly 64.

Returning to FIG. 3, it can be seen that the vertical adjustment assembly 74, on the right arm assembly 68, is adapted to receive a right shelf member 110. An orifice 112 is formed through the right shelf member 110. The right slide rod 86 passes through the orifice 112, joining the right shelf member 110 to the vertical adjustment assembly 74. The right shelf member 110 has a flat upper surface 118 that contacts and supports the guide flange 104 on the vertical adjustment assembly 74 (see FIG. 7a). A cavity 120 (see FIG. 3) is formed on the surface of the right shelf member 110 that faces the left shelf member 114. Similarly, the horizontal adjustment assembly 64, on the left arm assembly 60, is adapted to receive the left shelf member 114. An orifice 116 is formed through the left shelf member 114. The left shelf member 114 is coupled to the horizontal adjustment assembly 64 by the placement of the left slide rod 88 through both the horizontal adjustment assembly 64 and the second orifice 116. The left shelf member 114 has a fiat upper region 122 that contacts and supports the guide flange 108 on the horizontal adjustment assembly 74 (see FIG. 7a). The left shelf member 114 also includes a trapezoidal shaped projection 124 that engages the cavity 120 on the right shelf member 110 when the right shelf member 110 joins with the left shelf member 114. The positioning of the trapezoidal shaped projection 124 of the left shelf member 114 within the cavity 120 on the right shelf member 110, joins the left and right shelf members 114, 110 together and prevents independent movement of either shelf member in any direction other than straight apart from one another.

Figure 5:
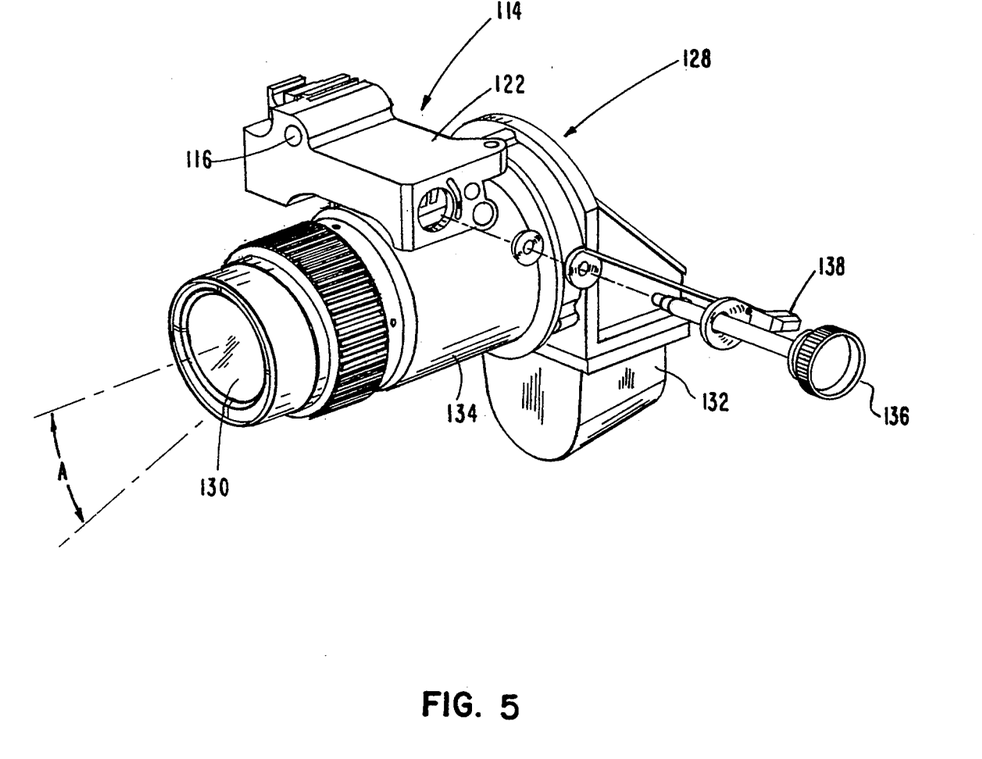
FIG. 5 is an isolated view of one monocular assembly of the present invention night vision device.

A right monocular assembly 126 and a left monocular assembly 128 are coupled to the bottoms of the right shelf member 110 and the left shelf member 114, respectively. Referring to FIG. 5 in conjunction with FIG. 3, it can be seen that each monocular assembly 126, 128 include an objective lens 130, an eyepiece assembly 132 and a housing 134 that contains an image intensifier tube. Both the right shelf member 110 the left shelf member 114 include adjustment knobs 136 for individual interpupillary adjustment. The adjustment knobs 136 allow each of the monocular assemblies 126, 128 to be adjusted in position relative to one another, thereby varying the distance D1 between the monocular assemblies 126, 128. Both the right shelf member 110 and the left shelf member 114 also include adjustment levers 138 which adjust the angle of inclination A of each of the monocular assemblies 126, 128.

When assembled and affixed to the helmet of a pilot, the distance of the monocular assemblies 126, 128 from a pilots eyes can be selectively adjusted by rotating the horizontal adjustment knob 106 on the horizontal adjustment assembly 64. The height of the monocular assemblies 126, 128 with respect to the pilots eyes can be selectively adjusted by rotating vertical adjustment knob 98 on the vertical adjustment assembly 74. The distance between monocular assemblies 126, 128 is adjusted by selectively engaging the adjustment knobs 136 on the left and right shelf members 114, 110. Lastly, the angle of inclination A for each of the monocular assemblies 126, 128 is adjusted by selectively manipulating the adjustment levers 138 next to each adjustment knob 136.

Figure 6A:
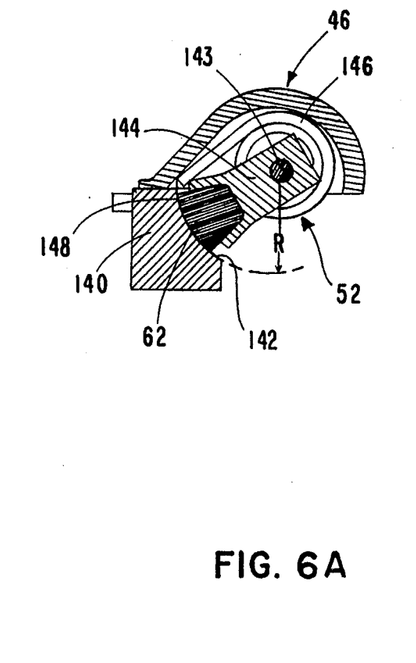
FIG. 6a, 6b, 6c are cross-sectional views of the left ejection assembly within the present invention night vision device, shown at three different positions during the operation of the ejection assembly.

Referring to FIG. 6a, a cross-section of left ejector assembly 52 is shown engaging the left pivot pin 62 of the left arm member 60. As can be seen, the left ejector assembly 52 includes stop member 140 having a face surface 142 that is curved along a given radius R. In the center of the ejector assembly 52 is a pivot 143 around which rotates a pivotable member 144 having a generally U-shaped face at one end. A torsion spring 146 is coupled to the pivotable member 144, biasing the pivotable member 144 into a set position. The left pivot pin 62 has a curved surface 148 that shares the same radius of curvature R as does the face surface 142 of the stop member 140. The pivot pin 62 is also shaped to be engaged by the U-shaped face of the pivotable member 144 in a manner that enables the pivot pin 62 to rotate with the pivotable member 144 and enables the curved surface 148 of the pivot pin 62 to slide along the face surface 142 of the stop member 140. Although FIG. 6a shows the left ejector assembly 52 only, it will be understood that the right ejector assembly 50 is similarly formed and engages the right pivot pin 72 of the right arm member 70 in a similar manner.

Figure 7A:
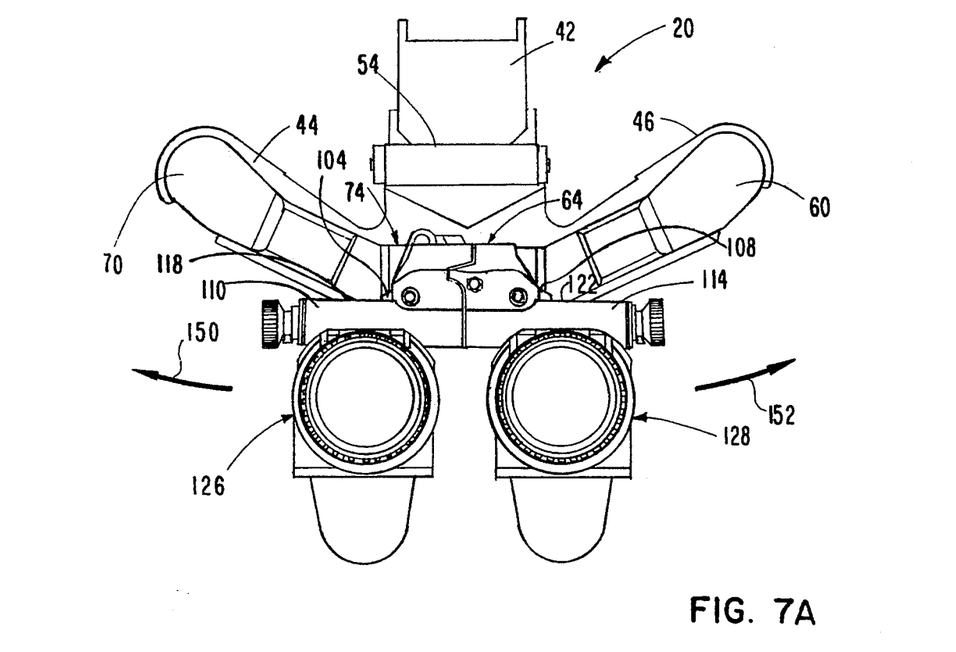
FIG. 7a, 7b, 7c are front views of the present invention night vision device, shown at three different positions corresponding to FIGS. 6a, 6b and 6c, respectively.

Referring to FIG. 7a, a front view of the present invention night vision assembly 20 is shown as it would appear fully assembled during use. When the night vision assembly 20 is in the condition depicted by FIG. 7a, the pivot pins extending from the left and right arm members 60, 70 engage the left and right ejector assemblies 52, 50 in the manner exemplified by FIG. 6a. In this orientation, the vertical adjustment assembly 74 is coupled to the horizontal adjustment assembly 64. Similarly, the right shelf member 110 is coupled to the left shelf member 114 and the overall night vision assembly 20 can be used as intended.

Figure 8A:
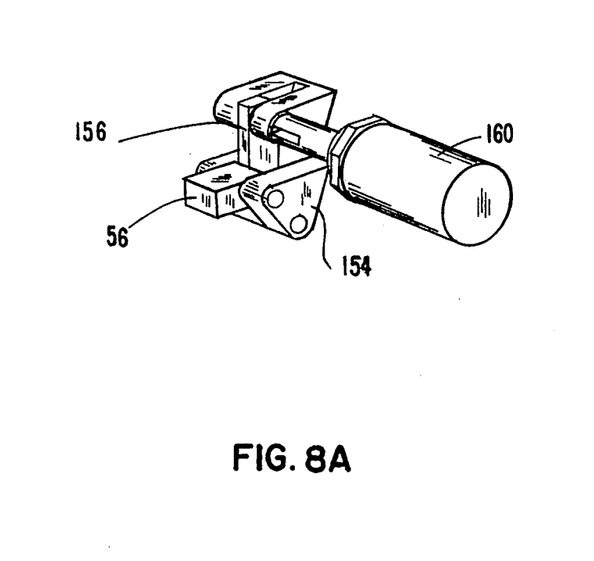
FIG. 8a and 8b are isolated views of the triggering solenoid of the present invention shown prior to activation and after activation, respectively.
Figure 8B:
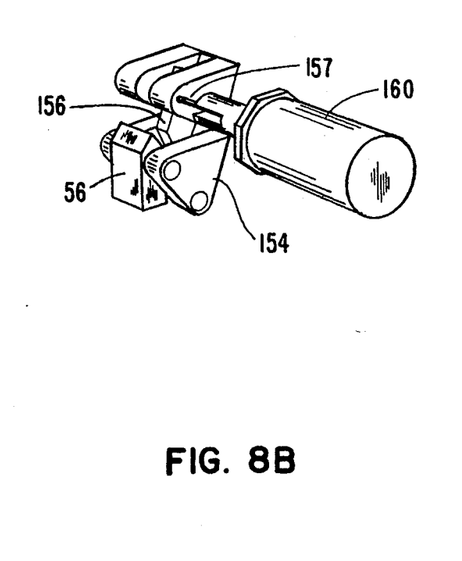

When the night vision assembly 20 is being used by the pilot, the left and right arm members 60, 70 are biased away from one another in the direction of arrows 150, 152, by the spring bias present in the left and right ejector assemblies 52, 50, respectively. A trigger bar 56 (shown in FIG. 3) extends in the horizontal direction from the central body 48 of the pivot assembly 40. The left and right arm members 60, 70 are both rest upon the trigger bar 56. As such, the trigger bar 56 prevents the left arm member 60 and the right arm member 70 from separating away from one another in the direction of arrows 150, 152. Referring to FIGS. 8a and 8b in conjunction with FIG. 3, it can be seen that the trigger bar 56 is pivotably attached to a bracket 154. The trigger bar 56 is held in the horizontal position by its engagement with a vertical bar 156. The vertical bar 156 is held in engagement with the trigger bar 56 by a locking pin 157 that joins the vertical bar 156 to the bracket 154. The locking pin 157 is attached to a solenoid 160. As can be seen from FIG. 8b, when the solenoid is activated, the locking pin 157 is pulled from the bracket 154. Consequently, the vertical bar 156 falls back and no longer engages the trigger bar 56. The trigger bar 56, subsequentially pivots into the vertical from its initial horizontal orientation. The solenoid 160 is empowered by the battery pack 54 positioned above the central body 48 surrounding the trigger bar 56. The activation of the solenoid 160 is triggered by the pilots enabling of the ejection mechanism present within the aircraft.

Figure 6B:
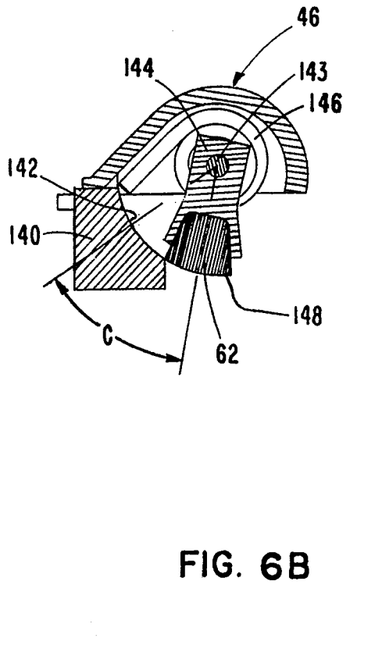
Figure 7B:
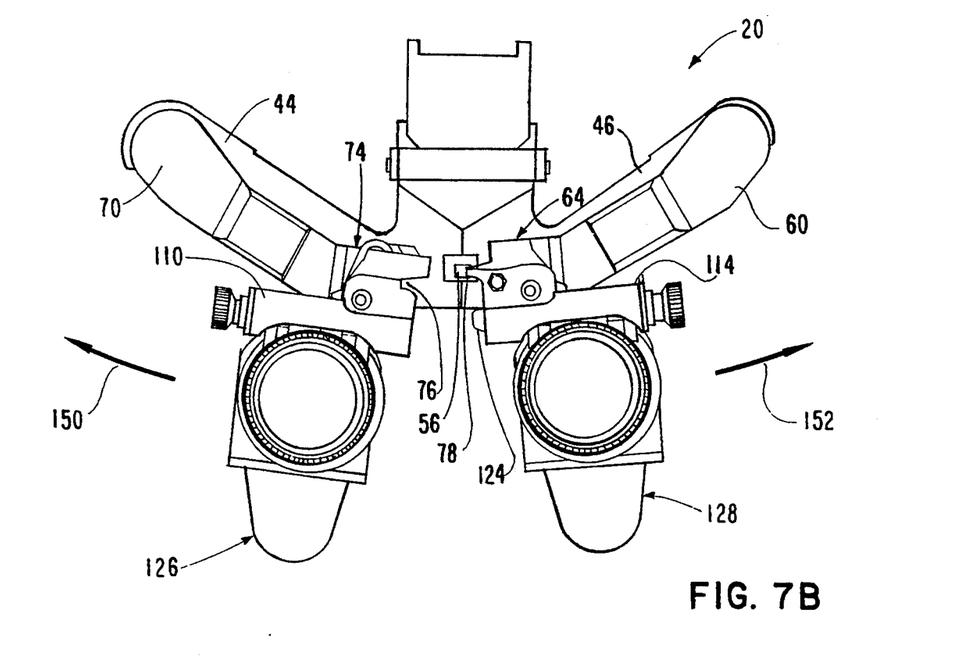

Referring to FIG. 8b, it can be seen that once the trigger bar 56 is activated, the trigger bar 56 no longer engages the left and right arm members 60, 70. Consequently, the left arm member 60 and the right arm member 70 begin to rotate away from each other, on the pivot assembly 40, in the directions of arrows 150, 152. The impetus of the rotation for the left and right arm members 60, 70 is provided by both gravity and the spring bias within the left and right ejector assemblies 52, 50. As the left arm member 60 and the right arm member 70 pivot away from one another, the vertical adjustment assembly 74 separates from the horizontal adjustment assembly 64. Similarly, the right shelf member 110 separates from the left shelf member 114. Referring to FIG. 6b in conjunction with FIG. 7b, it can be seen that as the left arm member 60 rotates, the left pivot pin 62 moves along the face of the stop member 140 as guided by the contour of the stop member 140 and the rotation of the pivotal member 144. As the left arm member 60 rotates across a desired arc C, the pivot pin 62 eventually travels past the curved face surface 142 of the stop member 140. In a preferred embodiment, the pivot pin 62 disengages from the stop member 140 after traveling across an arc C of approximately fifty degrees. It will be understood that although FIG. 6b only shows the operation of the left pivot pin 62 within the left ejection assembly 52, that the same function is simultaneously being performed in the right ejection assembly 50 with the right pivot pin 72.

Figure 6C:
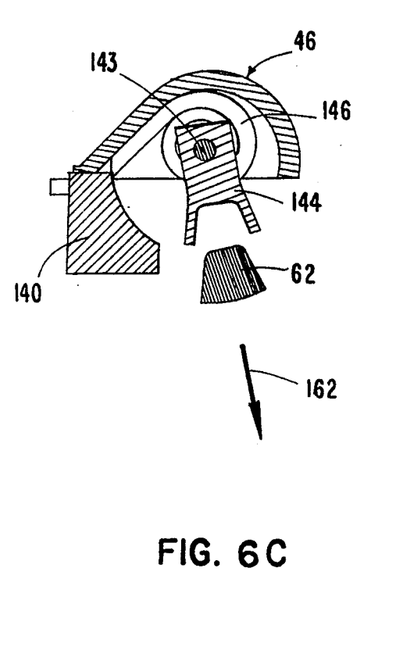
Figure 7C:
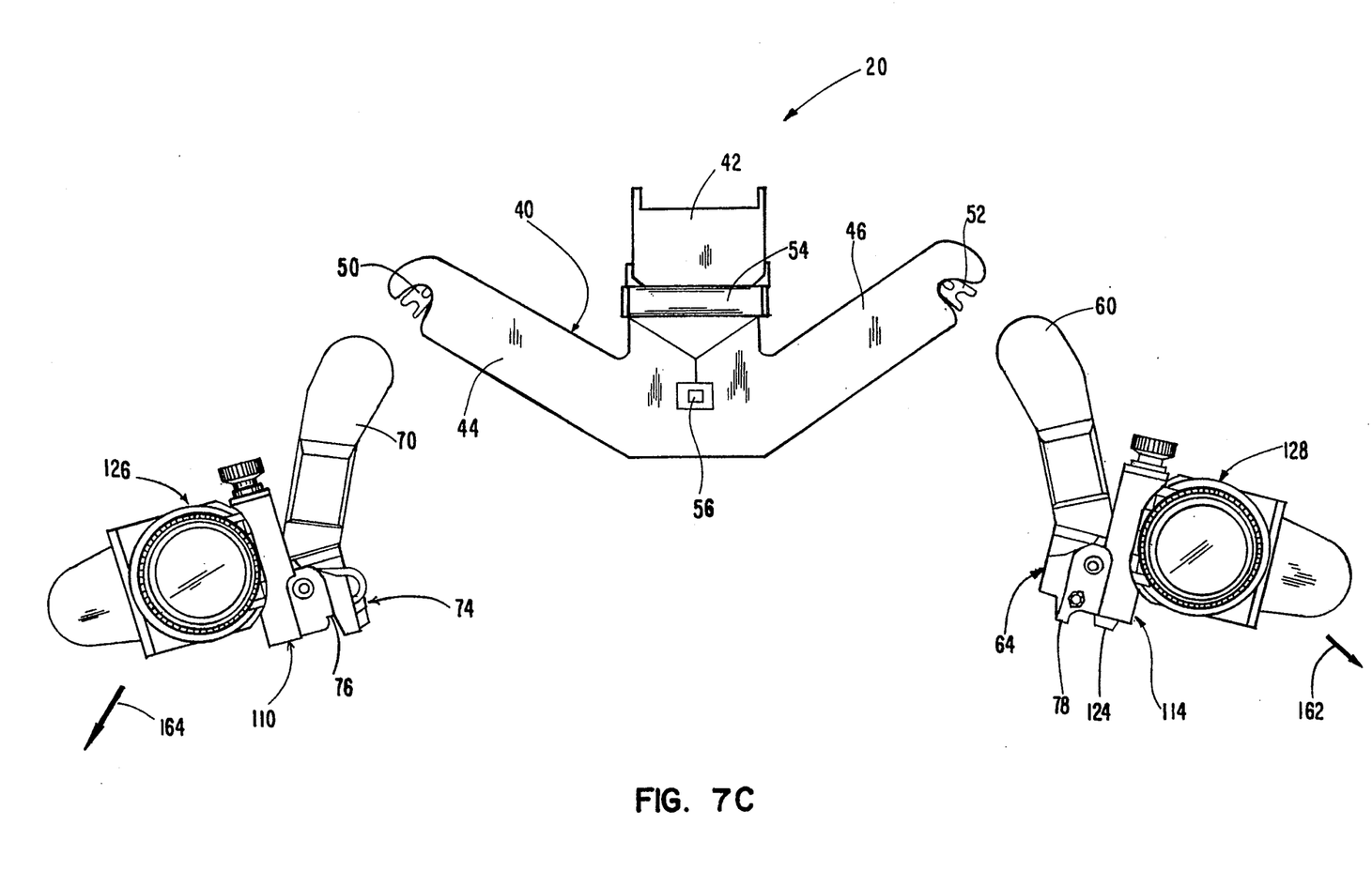

Referring to FIG. 6c, in conjunction with FIG. 7c, it can be seen that as the left pivot pin 62 travels beyond the confines of the stop member 140, the pivot pin 62 separates from the pivotal member 144 and the left arm member 60 flies free of the pivot assembly 40 in the direction of arrow 162. Simultaneously, the right arm member 70 flies free of the pivot assembly 40 in the direction of arrow 164. The configuration of the pivotal assembly 40, the right and left arm members 70, 60, and the strength of the spring bias in each of the ejector assemblies 50, 52 is calculated to laterally project each half of the night vision assembly to the sides of a pilot during ejection. In this manner, there is a reduced likelihood that the night vision assembly will strike a pilot during ejection and cause injury.

It will be understood that the present invention night vision device and method of ejection described herein are merely exemplary and that a person skilled in the art may make many variations and modifications to the described embodiments utilizing functionally equivalent components to those described. All such variations and modifications are intended to be included within the scope of this invention as defined by the appended claims.

What is claimed is:

1. A night vision device for a pilot of an aircraft, comprising:
 a first optical arrangement and a second optical arrangement;
 positioning means for selectively positioning said first optical arrangement and said second optical arrangement in front of the eyes of said pilot;
 propelling means for selectively propelling said first optical arrangement away from said pilot in a first direction, and propelling said second optical arrangement away from said pilot in a different second direction.

2. The night vision device according to claim 1, wherein said positioning means includes an attachment means for releasably attaching said first optical arrangement and said second optical arrangement to a helmet worn by said pilot.

3. The night vision device according to claim 1, further including a single vertical adjustment means for vertically adjusting said first optical arrangement and said second optical arrangement in unison, relative to the eyes of said pilot.

4. The night vision device according to claim 3, further including a single horizontal adjustment means for selectively adjusting the distance of said first optical arrangement and said second optical arrangement, in unison, relative to the eyes of said pilot.

5. The night vision device according to claim 4, further including a interpupillary adjustment means for selectively adjusting the distance between said first optical arrangement and said second optical arrangement.

6. The night vision device according to claim 5, further including an angle adjustment means for independently adjusting the angle of inclination of said first optical arrangement and said second optical arrangement relative to the eyes of said pilot.

7. The night vision device according to claim 1, further including a pivot mount assembly releasably attached to said helmet by said attachment means, and a trigger means disposed within said pivot mount assembly for selectively activating said propelling means.

8. The night vision device according to claim 7, wherein said first optical arrangement is coupled to a first arm member and said second optical arrangement is coupled to a second arm member, wherein said first arm member and said second arm member are pivotably attached to said pivot mount assembly and said first arm member and said second arm member are held in a set position by said trigger means, wherein said first optical arrangement and said second optical arrangement join to form a binocular assembly.

9. The night vision device according to claim 9, wherein said pivot mount assembly includes at least one spring bias means for engaging said first arm member and said second arm member, said at least one spring bias means providing a bias to pivotably rotate said first arm member and said second arm member away from said set position in opposite directions, wherein said trigger means selectively retains said first arm member and said second arm member at said set position in opposition of said spring bias means.

10. The night vision device according to claim 9, wherein said pivot mount assembly includes at least one separation means for separating said first arm member and said second arm member from said pivot mount assembly when said first arm member and said second arm member pivotably rotate away from said set position by a predetermined amount, whereby said first arm member and said second arm member are separated from said pivot mount assembly at a trajectory that causes said first arm member and said second arm member to fly clear of said pilot.

11. The night vision device according to claim 10, further including a vertical adjustment means coupled to said first arm member for vertically adjusting said first optical arrangement relative to the eyes of said pilot, a horizontal adjustment means coupled to said second arm member for horizontally adjusting the distance between said second optical arrangement and the eyes of said pilot, and a interlocking means for interlocking said vertical adjustment means and said horizontal adjustment means, whereby said interlocking means operates to join said first optical arrangement to said second optical arrangement so that said first optical arrangement and said second optical arrangement are moved in unison by said vertical adjustment means and said horizontal adjustment means.

12. The night vision device according to claim 7, wherein said attachment means includes a plurality of anchor mounts disposed on said helmet, a transition bracket selectively mountable to said plurality of anchor mounts, wherein said pivot mount assembly releasably attaches to said transition bracket.

13. The night vision device according to claim 8, wherein said trigger means includes a protruding member that engages said first arm member and said second arm member at a set position to prevent said first arm member and said second arm member from pivotably rotating away from said set position, and wherein said protruding member is automatically retracted by said trigger means, thereby allowing said first arm member and said second arm member to pivotably rotate from said set position.

14. A binocular night vision device for a pilot of an aircraft, comprising:
 a first optical assembly viewed by one eye of said pilot;
 a second optical assembly, coupled to said first optical assembly, and viewed by the other eye of said pilot;
 separation means for selectively separating said first optical assembly from said second optical assembly;
 propelling means for independently propelling said first optical assembly and said second optical assembly away from said pilot.

15. The binocular night vision device according to claim 14, wherein said propelling means includes a first spring bias means for biasing said first optical assembly away from said pilot, a second spring bias means for biasing said second optical assembly away from said pilot and a trigger means for retaining said first optical assembly and said second optical assembly at a set position, wherein said trigger means releases said first optical assembly and said second optical assembly from said set position and said first optical assembly and said second optical assembly are propelled away from said pilot by said first spring bias and said second spring bias.

16. The binocular night vision device according to claim 15, further including adjustment means for selectively adjusting the position of said first optical assembly and said second optical assembly relative to said pilot, wherein said adjustment means is propelled away from said pilot by said propelling means with said first optical assembly and said second optical assembly.

17. The binocular night vision device according to claim 15, wherein said first optical assembly is coupled to a first arm member and said second optical assembly is coupled to a second arm member, wherein said first arm member and said second arm member are pivotably coupled to a common mounting member on a helmet worn by said pilot and said first arm member and said second arm member disengage from said mounting member when pivotably rotated to a release position.

18. The binocular night vision device according to claim 17, wherein said first spring bias means biases said first arm member from said set position to said release position, and said second spring bias means biases said second arm member from said set position to said release location, whereby when said trigger means releases said first optical assembly and said second optical assembly, said first arm member and said second arm member travel from said set position to said release position with a impetus that propels said first optical assembly and said second optical assembly away from said pilot.

19. The binocular night vision device according to claim 18, wherein said adjustment means including a vertical adjustment means coupled to said first arm member for vertically adjusting said first optical assembly relative to the eyes of said pilot, a horizontal adjustment means coupled to said second arm member for horizontally adjusting the distance between said second optical assembly and the eyes of said pilot, and a interlocking means for interlocking said vertical adjustment means and said horizontal adjustment means when said first optical assembly and said second optical assembly are at said set position, whereby said first optical assembly and said second optical assembly act in unison at said set position and are moved together by said vertical adjustment means and said horizontal adjustment means.

20. A method of separating a night vision device from the helmet of a pilot ejecting from an aircraft, comprising the steps of:
   separating said night vision device into a plurality of unconnected sub-component assemblies;
   propelling each of said sub-component assemblies away from said pilot, whereby each of said sub-component assemblies are propelled away from said pilot.

21. The method according to claim 20, wherein said sub-component assemblies are biased away from said night vision device and are held at an operating position on said night vision device by a trigger mechanism, whereby the activation of said trigger mechanism causes said sub-component assemblies to be propelled clear of said pilot before said pilot is ejected from said aircraft.

22. The method according to claim 20, wherein said night vision device is a binocular assembly having a first optical arrangement and a second optical arrangement and said step of separating includes separating said first optical arrangement from said second optical arrangement and propelling each said optical arrangement to opposite sides of said pilot.

* * * * *